United States Patent [19]

Trinh et al.

[11] Patent Number: 4,638,780
[45] Date of Patent: Jan. 27, 1987

[54] INDIVIDUAL CYLINDER IGNITION CONTROL

[75] Inventors: Lahn T. Trinh; Thomas E. Lewis, both of San Diego, Calif.

[73] Assignee: Allied Corporation, Morristown, N.J.

[21] Appl. No.: 779,895

[22] Filed: Sep. 25, 1985

Related U.S. Application Data

[63] Continuation-in-part of Ser. No. 593,457, Mar. 26, 1984, abandoned.

[51] Int. Cl.$^4$ ............................. F02P 5/00; F02P 5/14
[52] U.S. Cl. ................................... 123/416; 123/417; 123/425
[58] Field of Search ................ 123/416, 415, 417, 418, 123/419, 425

[56] References Cited

U.S. PATENT DOCUMENTS

| | | | |
|---|---|---|---|
| 4,378,004 | 3/1983 | Petrie | 123/416 |
| 4,413,599 | 11/1983 | Shigematsu et al. | 123/425 |
| 4,414,946 | 11/1983 | Daumer et al. | 123/417 |

*Primary Examiner*—Raymond A. Nelli

[57] ABSTRACT

An ignition system for providing individual cylinder spark control includes a shaft encoder driven by the engine crankshaft which provides a primary timing pulse at the top dead center point of cylinder No. 1 as well as a large number of encoder pulses per engine revolution. With the primary timing pulse as a reference, the encoder pulses are supplied to a modulo N counter which provides output pulses at the theoretical top dead center point of each cylinder, to a cylinder address counter and to a fixed delay counter, which provides an output a fixed number of encoder pulses from the previous output pulse from the modulo N counter to set a maximum ignition advance point. A memory device has a channel programmed with information as to the variation, in terms of encoder pulses (crank angle) of each cylinder actual top dead center from the theoretical angle as defined by the modulo N counter output. The memory receives cylinder address information and the output from the fixed delay counter to cause it to unload binary information defining the delay from the maximum advance point to the variable delay counter. The variable delay counter output then sets the ignition timing for each individual cylinder.

12 Claims, 9 Drawing Figures

FIG.3

INDIVIDUAL CYLINDER IGNITION CONTROL

This application is a continuation in part of application Ser. No. 593,457 filed 3/26/84, now abandoned, by the inventors named herein.

This invention relates to ignition systems for multicylinder internal combustion engines and more particularly to a system for providing individual cylinder ignition control.

Practically all available ignition systems for multicylinder reciprocating spark ignition engines are designed to provide uniform spark angles or ignition advance angles for all cylinders. The timing of the uniform spark advance is predicated on the assumption that the top dead center of each cylinder will occur at the exact geometrical angle for which the engine was designed, i.e. every 45 degrees for an eight cylinder engine, every 60 degrees for a six cylinder engine, etc. With a four stroke cycle engine, this conventional ignition system would provide a spark every 90 degrees for an eight cylinder engine and every 120 degrees for a six cylinder engine. The spark timing is modified according to some desired schedule to provide each spark a desired number of degrees in advance of every second mechanical top dead center for each cylinder. The amount of spark advance for all cylinders may be varied simultaneously with various engine operating conditions such as rotational speed or manifold vacuum.

Many engines, especially large industrial engines vary sufficiently from the above assumptions that the described conventional ignition control system provides less than optimum operating conditions. This discrepancy, in the case of very large engines such as those of 2000 HP or more, may result in significant penalties in fuel consumption as well as other operating disadvantages. It has been found that on some large engines, conventional ignition systems deviate from their intended angles by as much as eight degrees. Add to such inaccuracies further errors caused by wear in bearings, wear and lost motion in the drive to the distributor or equivalent timing device, and variations in compression ratios due to wear of rings and cylinder walls, and it can be recognized that optimum timing for a given cylinder could well deviate from that provided by a conventional ignition system by a considerable margin. This mis-timing can result in excessive fuel consumption, loss of power and sometimes excessive vibration if the cylinder-to-cyliinder power varies substantially.

The primary object of the present invention is to provide an ignition system for multiple cylinder engines wherein ignition timing is controllably variable from cylnder to cylinder to provide substantially optimum timing for each cylinder.

To deal with the cylinder-to-cylinder variations referred to above, applicant has designed and provided an electronic spark ignition control for multicylinder engines using precise digital timing techniques to control the ignition timing to each individual cylinder. To minimize mechanical errors, a high resolution incremental shaft encoder is directly coupled to the engine crankshaft to register engine rotation. The shaft encoder generates a fixed number of pulses per shaft revolution, referred to below as NC pulses. The spark advance resolution is then 360/NC degrees. The encoder includes a reference mark aligned with the top dead center of cylinder #1. Since it requires two complete revolutions of the engine to ignite all the cylinders, there will be two such reference marks and means are included to resolve the ambiguity by selecting as the true reference only the mark associated with the compression stroke (TDC1). This is convenient because the spark timing or angle of cylinder #1 always occurs before the desired top dead center. Alternatively, a mark in the angular vicinity of the spark firing of cylinder #1 can be taken from either the camshaft or the magneto shaft, since these shafts normally ran at exactly one-half engine speed.

The TDC1 pulse is used to reset a counter in a digital processor. This counter, under the processor's control, counts NC pulses from the rotating shaft encoder and outputs marker pulses at the top dead centers of all the cylinders (designated TDCX). These TDCX marker pulses are then used to trigger a fixed delay counter and a cylinder sequence counter. The fixed delay counter simply delays the TDCX pulses by a fixed circular angle (number of NC pulses) and the cylinder sequence counter is incremented on each TDCX pulse, its function being to keep track of which cylinder the unit is controlling in real time. The output lines of the sequence counter drive the address lines of a ROM (read only memory) which ROM has been programmed in accordance with the actual measured geometry of each cylinder. Alternatively the ROM may be replaced or combined with a RAM which receives input signals from various engine operating conditions and which can then vary the timing of individual cylinders with changes in these conditions.

In the drawings:

FIG. 2b is a block diagram showing a modified form of the embodiments of FIG. 2a;

FIG. 4b is a block diagram showing a modified form of the embodiment of FIG. 4a;

Figure 1A:
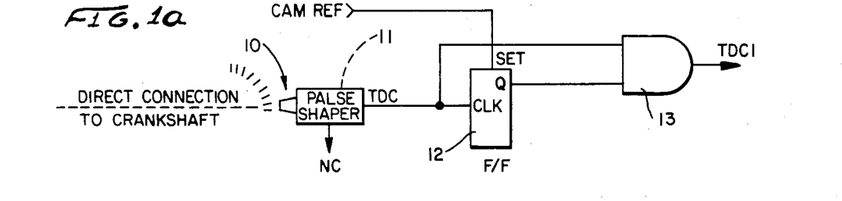
FIG. 1a is a diagram of a shaft encoder and circuit for providing an engine reference signal.
Figure 1B:
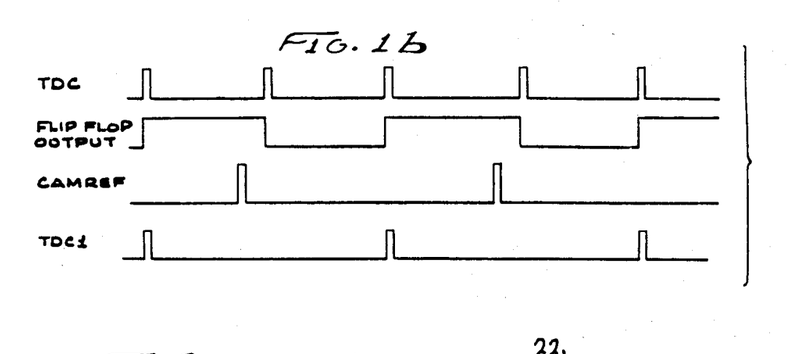
FIG. 1b is a timing diagram showing some of the signals generated in our ignition control system.

Referring now to FIG. 1a, a shaft encloder 10 which is preferably directly driven from the engine crankshaft and which may be an optical device produces a large number of pulses per revolution, such as 1440, referred to below as NC pulses and also provides a pulse representing a top dead center reference (TDC) such as that of cylinder #1. The TDC pulse which is shaped in a pulse shaper 11, is supplied to the clock terminal of a flip-flop 12. At its "set" input terminal the flip-flop 12 receives a pulse from the camshaft or other device turning at one-half engine speed. These two pulse trains are shown in FIG. 1b as graphs TDC and CAMREF. The flip-flop 12 is arranged such that it changes state to produce an "up" output for each TDC pulse not preceded by a CAMREF pulse and a "down" output when the TDC pulse is preceded by a CAMREF pulse. This output pattern, which appears on the graph "flip-flop output", is supplied as one input to an AND gate 13 which also receives the TDC pulse. The AND gate 13 will produce an output pulse only when the TDC pulse occurs during the "up" output phase of the flip-flop 12. This provides an engine reference signal which occurs only every other engine revolution and represents the top dead center point of cylinder #1 following the compression stroke. Alternatively, a magneto or distributor which turns half engine speed can provide a signal at each of its revolutions which can be used to select the desired top dead center pulse to serve as TDC1.

Figure 2A:
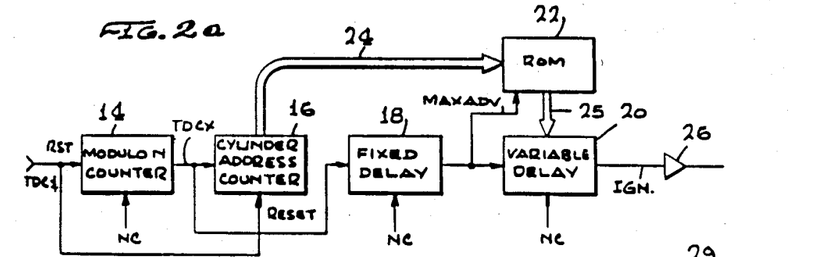
FIG. 2a is a block diagram showing one embodiment of our ignition system.

FIG. 2a is a block diagram showing one embodiment of our ignition system which is described in terms of an even firing six cylinder engine. In this embodiment, the engine reference pulses TDC1 are supplied to a modulo N counter 14. Counter 14 also receives the NC counts which constitute a comparatively large number (such as 1440 pulses per revolution) to provide good resolution. Counter 14 will output a carry pulse after every N counts where N is equal to 2×NC/No. of cylinders. Where NC=1440 counts/revolution and the engine has six cylinders, the N=2×1440/6 or 480. Therefore, counter 14 will output a pulse every 480 counts which corresponds with the theoretical top dead center point of each cylinder (TDC1 through TDC6), as shown on FIG. 3. This evenly spaced pulse train TDCX is supplied to a cylinder address counter 16 and to a fixed delay counter 18. The fixed delay counter which also receives NC counts delays the TDCX pulse by a fixed number of NC counts, which corresponds to a delay of a fixed crank angle. These delayed pulses are shown on FIG. 3 as the pulse train identified MAXADV since they actually identify a uniform crank angle representing a maximum advance from the top dead center positions represented by the TDCX train. Thus the arrival of the TDC1 pulse at fixed delay counter 18 will cause this counter to count a given number of NC counts before it outputs a pulse representing the maximum ignition advance point for cylinder #2 which may, for example, be thirty degrees before TDC2. Similarly, the TDC2 pulse will cause counter 18 to output a pulse representing maximum ignition advance such as thirty degrees for cylinder number 3, etc. These MAXADV pulses are supplied to a variable delay circuit 20 and to a ROM (read only memory) 22.

Figure 2B:
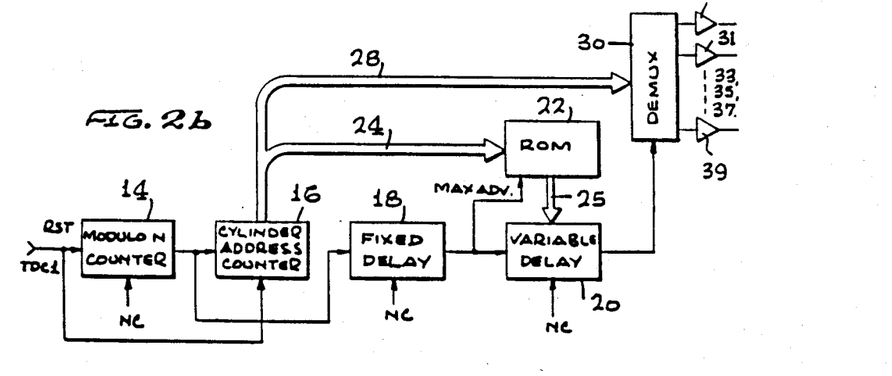

ROM 22 also receives an input from the cylinder address counter 16 which is incremented with each TDCX pulse and whose function is to keep track of which cylinder is being controlled on an instantaneous basis. Thus cylinder address counter 16 will operate through a bus 24 to gate the correct address lines of ROM 22. Each address line or ROM 22 (six such address lines for a six-cylinder engine) has been pre-programmed with a set of binary numbers to provide a given count delay from the MAXADV angle according to the actual measured geometry of each cylinder. As counter 18 issues MAXADV pulses, it issues a READ strobe signal to ROM 22 and also initiates the delay action of the variable delay counter 20. ROM 20 will then unload to variable delay circuit 20 a binary value corresponding to the given count delay from MAXADV to the cylinder address indicated by the cylinder address counter 16, via a bus 25. Variable delay counter 20 will then delay the MAXADV pulse by an NC count representing the crank angle programmed in ROM 22. The output pulses of variable delay counter 20 are then signal conditioned by circuit 26, the output of which is used to trigger an electronic ignition unit directly for engine ignition. This output system is used where some form of distribution or spark decommutator mechanism is employed (such as a distributor).

Where no such distribution mechanism is used, the system will be like that shown in FIG. 2b. In this system all the parts are identical with those shown in FIG. 2a except that the bus 24 also connects with a bus 28 which supplies the binary cylinder number from cylinder address counter 16 to a demultiplexer 30. Also supplied to the demultiplexer 30 is the output from variable delay counter 20. This enables the demultiplexer 30 to supply properly timed ignition signals in the proper sequence to the separate signal conditioning circuits 29, 31, 33, 35, 37 and 39 which supply ignition pulses to the separate cylinders.

Figure 3:
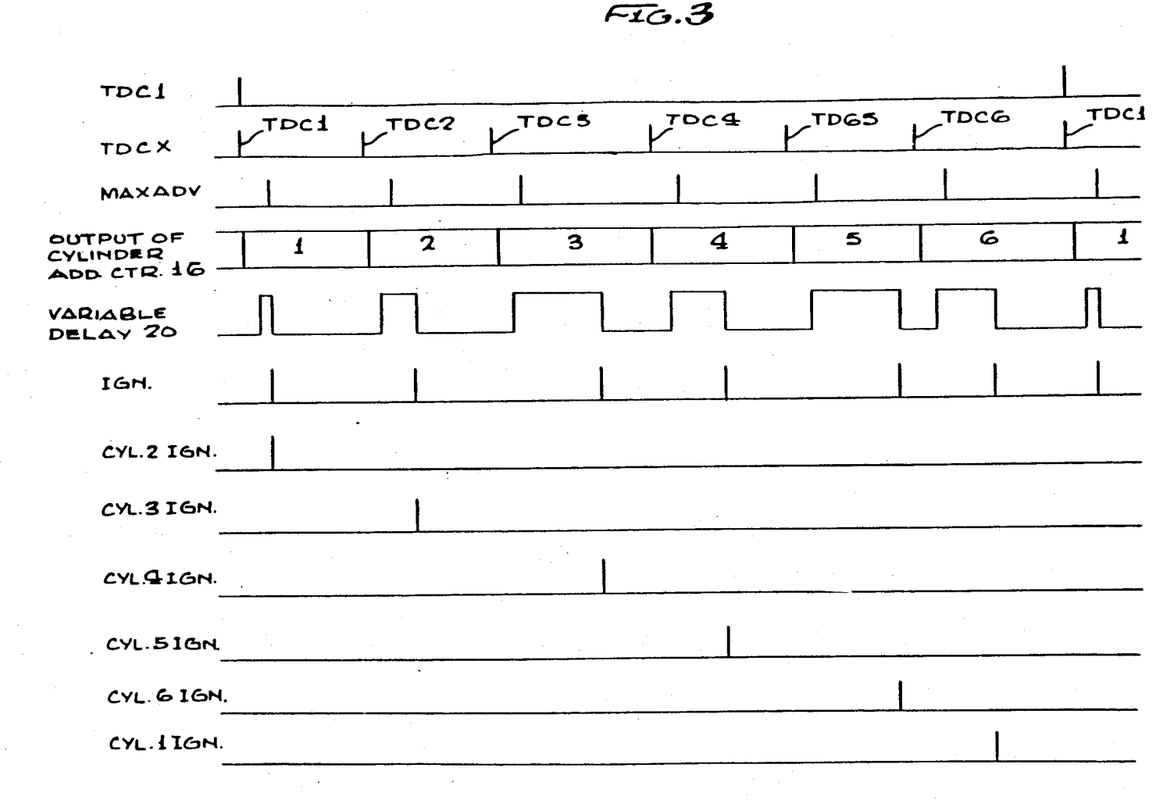
FIG. 3 is an additional timing diagram including other signals generated in the embodiments of FIGS. 2a and 2b.

In the timing diagram, FIG. 3, it will be seen that the TDCX pulses supplied to cylinder address counter 20 result in opening a time window causing each of the separate cylinder address channels in ROM 22 to receive a MAXADV pulse from fixed delay 18, to delay it as programmed in variable delay counts 20 for each cylinder, and to connect the delayed ignition pulses in the proper sequence to the demultiplexer 30. The graph marked "variable delay 20" shows the manner in which variable delay counter 20 can delay the MAXADV pulses by varying amounts. The actual ignition timing is then established by the trailing edges of the delay pulses from variable delay counter 20. It will be appreciated that the pulse width variations as shown in the graph are exaggerated relative to the scale since the MAX-ADV pulses would normally be set at approximately 30 degrees before each TDCX pulse, thus forming a window of about 30 degrees for variations in spark advance. The TDC1 pulse forms a reference for ignition of cylinder #2 (CYL 2 IGN), TDC2 pulse forms a reference for CYL 3 IGN, etc.

Figure 4A:
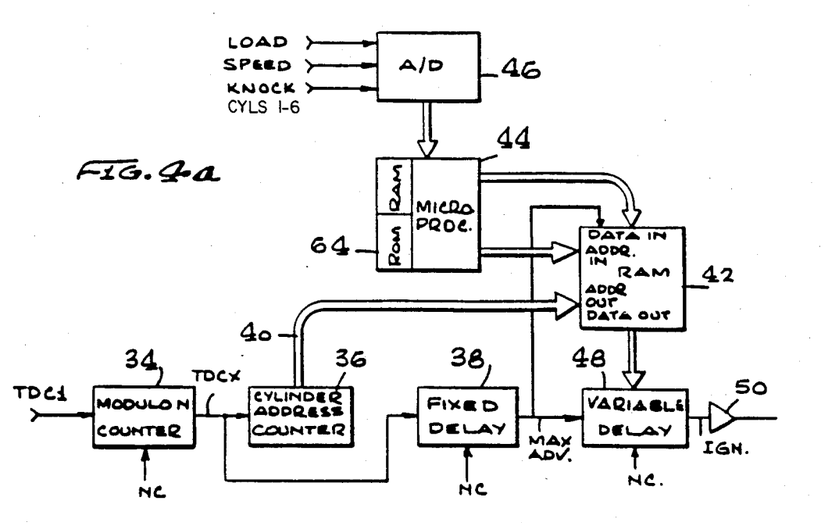
FIG. 4a is a block diagram showing another embodiment of our ignition system.

The embodiment of FIG. 4a is similar to that of FIG. 2a but incorporates an additional feature to permit the variable delay to be modified by various engine operating conditions. Thus, the ignition timing may be varied on an individual cylinder basis not only with differences in engine geometry but also with changes in factors such as loading, engine rpm or sensed incipient engine knock (CYLS 1-6). As in the FIG. 3 embodiment, the TDC1 and NC signals are supplied to the modulo N counter 34, which provides TDCX inputs to the cylinder address counter 36 and the fixed delay circuit 38. The cylinder address counter 36 supplies through bus 40, proper signals to gate the correct cylinder address lines in a RAM (random access memory) 42. Fixed delay circuit 38 supplies MAXADV counts to a variable delay circuit 48. Also supplied to RAM 42 are data signals from a microprocessor 44 which receives digitized signals representing instantaneous values of engine operating conditions such as load, speed or knock from an analog to digital converter 46. Microprocessor 44 is responsible for looking up the appropriate average magnitude of spark advance for corresponding values of speed, load etc., then it subtracts or adds the necessary offsets in cylinder-to-cylinder crankarm variation. This information is stored in program memory in the form of a ROM in microprocessor 44 and was obtained by actually measuring the true top dead centers along the crank revolution for each cylinder.

Each memory location of RAM 42 contains the individual spark advance magnitude of its corresponding cylinder. These RAM locations are sequentially off-loaded onto the variable delay counter 48 by the cylinder address counter 36. At the same time the microprocessor 44 continuously monitors engine speed, load and knock on an individual cylinder basis, and looks up the corresponding value of average spark advance, and computes the adjusted individual spark advance values. It then writes all these values into the RAM 42 cylinder address locations during operation of the engine. These variables all constitute, on a cylinder-to-cylinder basis, modifications of the MAXADV signal supplied to variable delay circuit 48. As each cylinder's ignition cycle is addressed by cylinder address counter 36, RAM 42 supplies a binary count representing the proper variable delay to the variable delay counter 48. The output signals from the variable delay counter 48 are then supplied to a signal conditioning circuit 50 before being supplied to an engine ignition unit, as described above with respect to FIG. 2a.

Figure 4B:
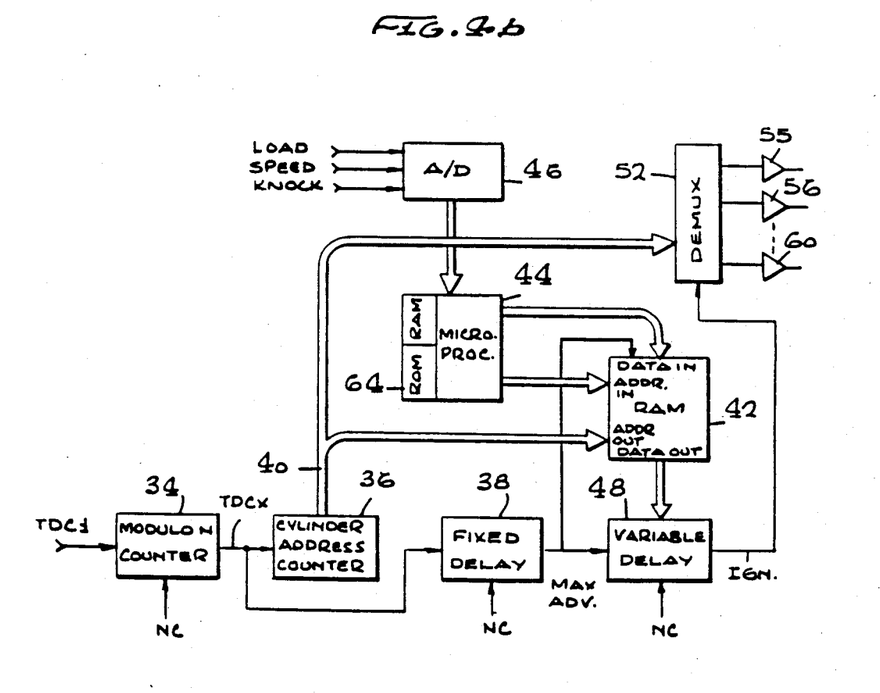

As in the case of FIG. 2b, the arrangement of FIG. 4b is used when no distributor or spark decommutator system is used. In this case the parts are identical with those of FIG. 4a except that bus 40 also connects with a demultiplier 52 thereby supplying the binary cylinder address number to the demultiplexer. Also supplied to demultiplexer 52 is the output from the variable delay counter 48 so that the demultiplexer 52 receives the spark advance information from the variable delay counter 48 in proper sequence as cylinder address counter 36 gates the proper cylinder address. Each of these spark advance signals is then conditioned in one of signal conditioners 55 through 60 before being connected directly to each cylinder ignition device (spark plug).

Figure 5:
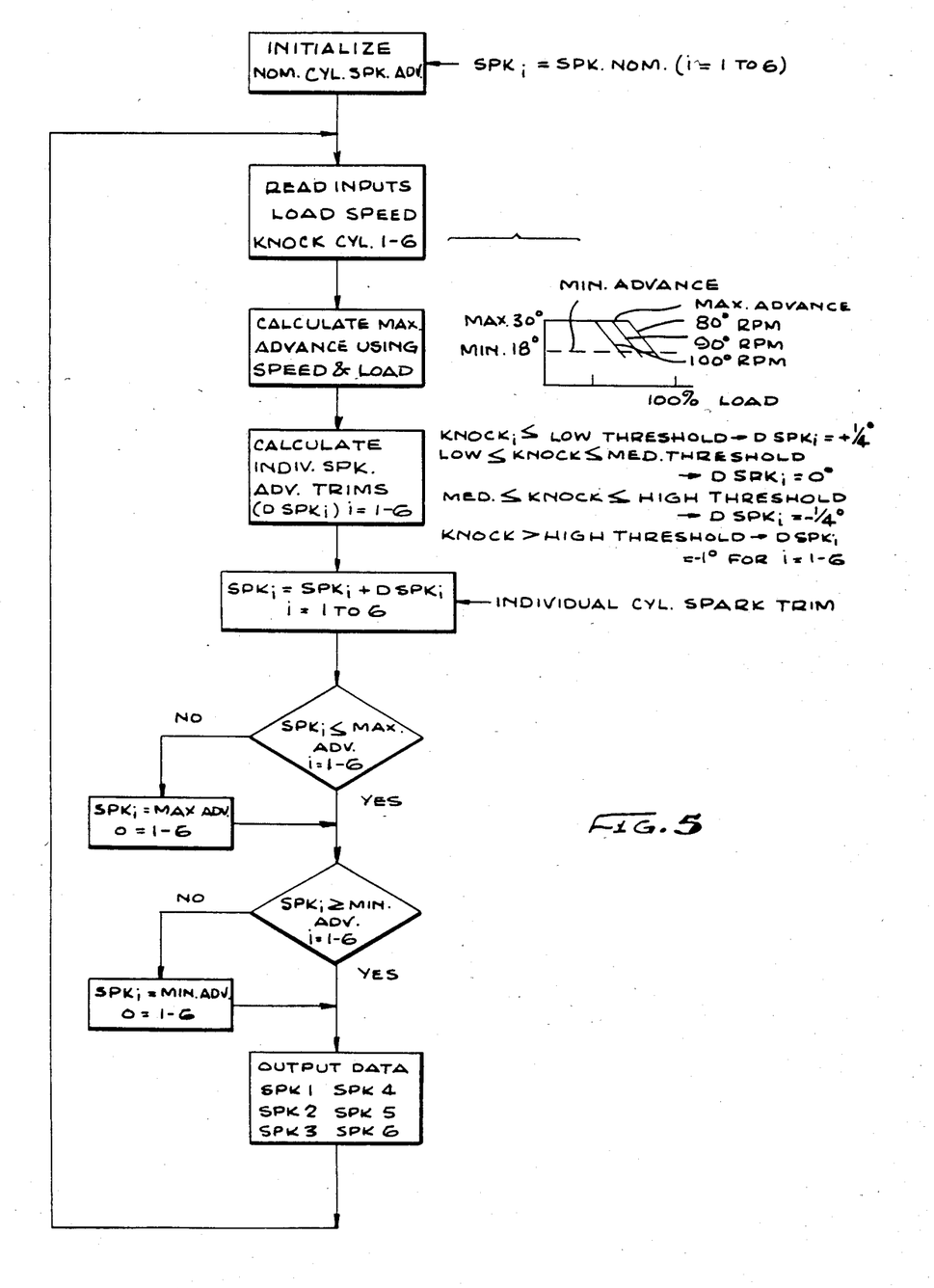
FIG. 5 is a flow diagram explaining the operation of the systems described in FIGS. 4a and 4b.

FIG. 5 is a flow diagram illustrating the operation of the systems of FIGS. 4a and 4b. As described, the microprocessor 44 includes a ROM 64 which may also be a PROM (programmable read only memory). This memory contains nominal spark advance information for each cylinder based on the predetermined cylinder-to-cylinder variations and appears as the top box labelled "Initialize Nominal Cylinder Spark Advance". This information is modified in the microprocessor 44 which variations in the instantaneous values of load, speed and the sensed knock, if any, in individual cylinders. The microprocessor 44 then uses this information to calculate the maximum spark advance using speed and load as indicated in the graph. The individual spark trims are then calculated which vary individual spark angles with variations in sensed knock. As shown in the table, this step will cause the individual spark timing to be shifted between advancing one-quarter degree and retarding one degree. The amounts of advance or retard will be tailored for the individual engine installation, of course. The individual spark advance numbers are then supplied to the decision blocks which essentially function to form maximum and minimum boundaries on spark advance. This output data, which provides the individual spark advance numbers is supplied as data to the ram 42 and is repetitively reinitiated to cause the microprocessor to continue performing the same computations over and over.

On some large engines, especially those with the cylinders in a "V" configuration, the angles of the banks may be much narrower than would be optimum mechanically and some top dead center to top dead center (TDC to TDC) intervals are very close together. In some instances these intervals are so short that the system would have insufficient dynamic range in spark advance if the system were restricted to the consecutive TDC to TDC intervals. Such short timing intervals typically occur between cylinders on opposite banks rather than between cylinders on the same bank. Where this type of problem exists the main counting/delaying chain is split into two channels, one controlling the even numbered cylinders and the other controlling the odd numbered cylinders. Either channel, by itself, becomes periodic.

Figure 6:
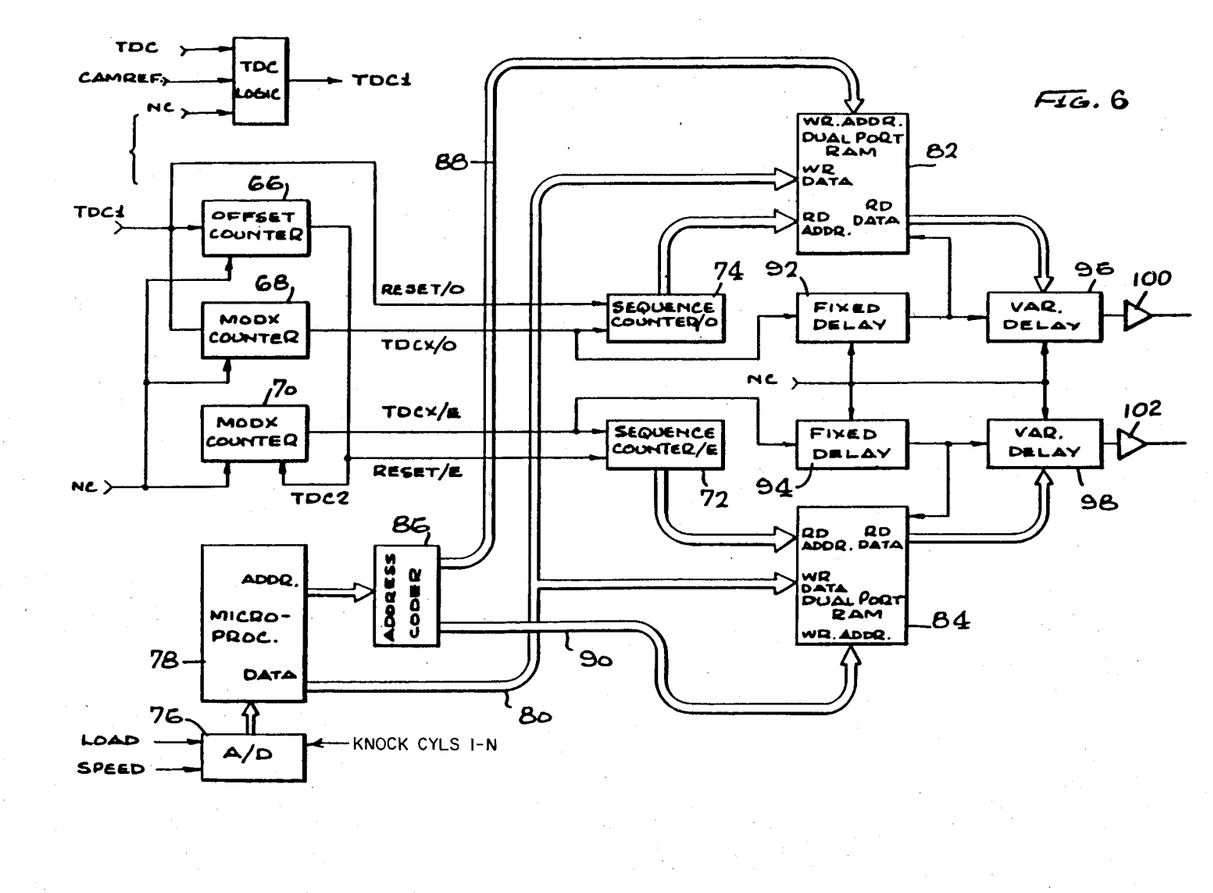
FIG. 6 is a block diagram showing a still further embodiment of our ignition system.

Referring now to FIG. 6, it will be observed that the system receives NC counts which are supplied to each of an offset counter 66, an odd number cylinder channel modulo counter 68 and an even numbered cylinder channel modulo counter 70. The TDC1 count is supplied to the offset counter 66 and to modulo counter 68. The offset counter 68 is programmed to emit A TDC2 pulse to counter 70 a given number of NC pulses following TDC1, which interval defines the geometric angle between the cylinder banks. In this manner, the even numbered TDCX count is updated every TDC1 pulse (every two revolutions) and counter 70 will emit TDCX/E (even numbered cylinder) pulses to the even numbered cylinder address counter 72. Similarly, the modulo counter 68 receives the TDC1 pulses and then provides the TDCX/O (odd numbered cylinder) pulses to the odd numbered cylinder address counter 74. The TDC1 pulse is also connected to cylinder address counter 74 to reset it every other revolution. The TDC2 pulse is used to reset the even numbered cylinder address counter 72 in the same manner so that each of counters 72 and 74 are updated every other engine revolution.

Also supplied as input signals to the system of FIG. 5 are analog signals responsive to engine speed and load. These are digitized in analog to digital converter 76 and supplied to a microprocessor 78 whose operation and function is essentially the same as that of microprocessor 44, described above. It continually monitors the load and speed inputs and finds the average value of spark advance for the sensed load and speed values. These values, combined with the crankarm variation information programmed in microprocessor 78 are then connected through a bus 80 to the "write data" terminals of each of two dual port RAMs 82 and 84. At the same time, the microprocessor supplies address codes for each cylinder. These addresses are decoded (segregated) in the address decoder 86 and supplied through busses 88 and 90 to the "write address" terminals of RAMs 82 and 84, respectively. In the same manner as that described above, the TDCX/O and TDCX/E pulses are supplied as input signals to their respective fixed delay circuits 92 and 94, where they delay their TDCX signals by a predetermined number of NC counts. As described above, these delayed pulses constitute the MAXADV pulse train for each cylinder bank. Each such pulse train is supplied to variable delay circuits 96 or 98 and to one of RAMs 82 and 84, where it effectively provides a maximum ignition advance angle used in the RAM as a reference for such corrections as are defined by the microprocessor 78. As controlled by th cylinder address counters 72 and 74, the RAMs 82 and 84 sequentially off-load the binary delay information from the several cylinder addresses to the variable delay circuits which use the binary information to compute the delay, in terms of NC counts, from the MAXADV reference and issue a pulse at the computed optimum time for ignition of each cylinder. The output pulse from variable delay circuit 96 is signal conditioned in an amplifier 100 before being supplied to an ignition unit to ignite the proper odd numbered cylinder. Similarly, the output pulses from variable delay circuit 98 are conditioned in an amplifier 102 before being supplied to an ignition unit to ignite the proper even number cylinder.

The above-described embodiment is used with an engine having a distributor or other spark decommutator mechanism. Where no such mechanism is used, each channel can be connected through a demultiplexer in the same manner as described above with respect of FIGS. 2b and 4b.

While only a limited number of embodiments have been disclosed herein, those skilled in the art will recognize that modifications may be made within the scope of the present invention. The output pulses may be supplied to various kinds of ignition devices such as magnetos, distributors, electronic ignition modules, etc. The TDC1 reference signal may be generated a described above, or taken directly from a magnetic signal source on a magneto which turns at half engine speed, or from a camshaft. For maximum freedom from mechanical error, the TDC1 reference should be taken directly from the engine crankshaft encoder. The camshaft or magneto shaft will provide a signal which is quite adequate to use as a reference for resolving the desired TDC signal to establishing TDC1.

We claim:

1. An ignition system for providing individual cylinder spark control for multicylinder engines including a shaft encoder directly connected to the engine crankshaft, said encoder producing a large number of encoder pulses per engine revolution (NC), means connected to said shaft encoder producing a single timing reference pulse every other shaft revolution at the same reference shaft position, a first counter connected to receive said timing reference pulses and said encoder pulses (NC) and to produce a carry pulse after every N counts where N is equal to 2NC/number of cylinders of said engine and N counts thus represents the theoretical crank angle between successive cylinder reference shaft positions, second and third counters connected to receive each carry pulse, said second counter delaying said carry pulse by a fixed number of encoder output pulses to produce a maximum timing advance, said third counter being incremented one step for each carry pulse and being also connected to be reset by each timing reference pulse to synchronize said third counter with engine rotation, memory means having a plurality of memory locations containing code information representing actual measured individual offset crankshaft angles for each individual cylinder of the engine being controlled, a variable delay counter and means connecting said second counter to said memory means and to said variable delay counter to cause said memory means to unload a code number to said variable delay counter corresponding to the cylinder indicated by said third counter, each said code number being delayed by said maximum timing advance, said variable delay counter thereby producing ignition pulses for each cylinder in which the timing is retarded from said maximum timing advance as defined by its corresponding code number.

2. An ignition system as claimed in claim 1 wherein a microprocessor is connected to said memory means, digital signals representative of instantaneous values of at least one engine operating condition are supplied to said microprocessor, and said microprocessor provides code information representative of the average magnitude of spark advance for said instantaneous values and adds or subtracts the necessary offsets in timing from those established in said memory means.

3. An ignition system as claimed in claim 2 wherein an analog to digital converter is connected to said microprocessor and said signals representing an engine operating condition are supplied to said analog-to-digital converter, said signals being convereted to digital form in said converter and supplied to said microprocessor.

4. An ignition system as claimed in claim 3 wherein said memory means includes a random access memory and said mircoprocessor includes a random access memory connected to receive digital signals from said analog to digital converter.

5. An ignition system as claimed in claim 4 wherein said digital signals are representaive of instantaneous values of engine rotational speed and engine load.

6. An ignition system as claimed in claim 4 wherein said digital signals are representative of instantaneous values of sensed engine knock.

7. An ignition system as claimed in claim 3 wherein said ignition system includes a plurality of channels, each channel controlling the ignition timing to a particular group of cylinders, said system including an offset counter connected to receive said timing reference pulses and providing a second timing pulse delayed a predetermined number of encoder pulses from said timing reference pulses, at least fourth, fifth and sixth counters corresponding to said first, second and third named counters with said fourth, fifth and sixth counters receiving said encoder pulses and said second timing pulses, a second memory means with said microprocessor being connected to said second memory means, a second variable delay counter and means connecting said fifth counter to said second memory means to cause said second memory means to unload a coded member to said second variable delay counter corresponding to the cylinder number addressed by said sixth counter, said second variable delay counter thereby providing output pulses to said engine establishing ignition timing for a second group of individual cylinders.

8. An ignition system for providing individual cylinder spark control for multicylinder engines including a shaft encoder directly connected to the engine crankshaft, said encoder being capable of producing a large number of encoder pulses per engine revolution (NC), index means producing a single output pulse per engine revolution times with the top dead center point of a given cylinder, means selecting every other said top dead center pulse as a timing reference (TDC1), a counter connected to receive said encoder pulses and said timing reference to provide a carry pulse after every N encoder count where N is equal to 2NC/number of cylinders of said engine and N counts then represents the theoretical crank angle between successive cylinder top dead center points following each compression stroke, second and third counters connected to receive each carry pulse, said second counter delaying said carry pulse by a fixed number of encoder output pulses and the third counter being incremented one step for each carry pulse and being also connected to be reset by each timing reference pulse to synchronize said third counter with engine rotation, a read only memory having memory locations containing binary numbers representing actual measured individual offset angles for each individual cylinder of the engine being controlled, a variable delay counter and means connecting said second counter to said read only memory and to said variable delay counter to cause said read only memory to unload a binary number to said variable delay counter corresponding to the cylinder number addressed by said third counter, each said binary number being delayed by the fixed number of pulses represented by said second counter, said variable delay counter thereby providing output pulses to said engine establishing ignition timing for said individual cylinders.

9. An ignition system as claimed in claim 8 wherein a miscroprocessor is connected to said read memory, digital signals representative of instantaneous values of at least one engine operating condition are supplied to said microprocessor, and said microprocessor provides code information representative of the average magnitude of spark advance for said instantaneous values and adds or subtracts the necessary offsets in timing from those established in said read only memory.

10. An ignition system as claimed in claim 9 wherein an analog to digital converter is connected to said microprocessor and said signals representing an engiuer operating condition are supplied to said analog-to-digital converter, said signals being converted to digital form in said converter and supplied to said microprocessor.

11. An ignition system as claimed in claim 10 wherein said microprocessor includes a second random access memory connected to receive digital signals from said digital to analog converter.

12. An ignition system as claimed in claim 11 wherein said digital signals are representative of instantaneous values of engine rotational speed and of sensed engine knock.

* * * * *